United States Patent
Shenk

[11] Patent Number: 5,542,346
[45] Date of Patent: Aug. 6, 1996

[54] CRUMB COLLECTION TRAY

[76] Inventor: Steve Shenk, 81 Fairmount Rd., Califon, N.J. 07830

[21] Appl. No.: 351,069

[22] Filed: Nov. 30, 1994

[51] Int. Cl.⁶ .................................................. A47J 37/08
[52] U.S. Cl. ................... 99/400; 99/375; 99/446
[58] Field of Search ........................ 99/400, 375, 401, 99/425, 337, 327, 329 R, 328, 385, 389, 408, 391–394, 395, 334, 335, 444–446; 219/385–387, 521

[56] References Cited

U.S. PATENT DOCUMENTS

| | | | |
|---|---|---|---|
| D. 282,045 | 1/1986 | Pratt | D7/390 |
| D. 329,571 | 9/1992 | Fehon | D7/390 |
| 716,366 | 12/1902 | Bayno | 99/400 |
| 1,543,362 | 6/1925 | Boletino | 99/400 |
| 2,465,577 | 3/1949 | Cox | 99/400 |
| 2,545,404 | 3/1951 | Young | 99/400 |
| 2,596,243 | 5/1952 | Ireland | 99/400 |
| 3,091,171 | 5/1963 | Cole | 99/400 |
| 3,169,469 | 2/1965 | Parr | 99/400 |
| 3,636,858 | 1/1972 | Paaskesen | 99/335 |
| 3,669,002 | 6/1972 | Davidson | 99/327 |
| 4,285,272 | 8/1981 | Klijnstra | 99/401 |
| 4,647,758 | 3/1987 | Kelian | 219/521 |
| 4,924,844 | 5/1990 | Bransburg | 99/400 |

FOREIGN PATENT DOCUMENTS 2117627  10/1983  United Kingdom ................. 99/400

Primary Examiner—Timothy F. Simone
Attorney, Agent, or Firm—Randy Lacasse

[57] ABSTRACT

A crumb collection tray to be placed underneath a conventional toaster after first removing its trap door, therefore allowing all crumbs to drop into the collection tray. After toasting, a simple dumping of the tray in the sink disposes of all crumbs in one simple act. The tray is equipped with a handle, a foot, and wheels which allow ease in mobility and prevent the counter from becoming scratched by otherwise dragging the crumb collection tray across the counter top. The crumb collection tray allows for easy cleaning after every use, disposing of crumbs that would otherwise attract bugs.

5 Claims, 1 Drawing Sheet

CRUMB COLLECTION TRAY

BACKGROUND OF THE INVENTION

1. Field of Invention

The present invention relates generally to the collection and removal of discarded food particles and more specifically to the collection and removal of bread crumbs from a toaster. Although the crumb collection tray of the present invention may be used anywhere, it was created for people living in Southern states with bug infestation problems and will be cheaply priced to allow purchase by lower income families, who may live in apartments that have bugs.

2. Discussion of Prior Art

In the prior art, it is common for toasters to utilize a vented trap door that insufficiently collects crumbs and can only be cleaned by unplugging the toaster. They fail to provide for an easy method of emptying the toaster of its crumbs which tend to build up and attract bugs. The prior art has failed to produce a product which is separate, portable and easy to clean.

Two references have been included which illustrate prior art toaster bases. U.S. Pat. No. Des. 329,571 discloses an ornamental toaster base, and U.S. Pat. No. Des. 282,045 discloses a toaster cover and base.

SUMMARY OF THE INVENTION

A crumb collection tray is to be placed underneath a conventional toaster after first removing it's trap door therefore allowing all crumbs to drop into the collection tray. After toasting, a simple dumping of the tray in the sink disposes of all crumbs in one simple act. In the preferred embodiment, the tray is equipped with a handle, a foot, and wheels which allow ease in mobility and prevent the counter from becoming scratched by otherwise dragging the crumb collection tray across the counter top. The crumb collection tray allows for easy cleaning after every use, disposing of crumbs that would otherwise attract bugs.

DESCRIPTION OF THE PREFERRED EMBODIMENT

Figure 1:
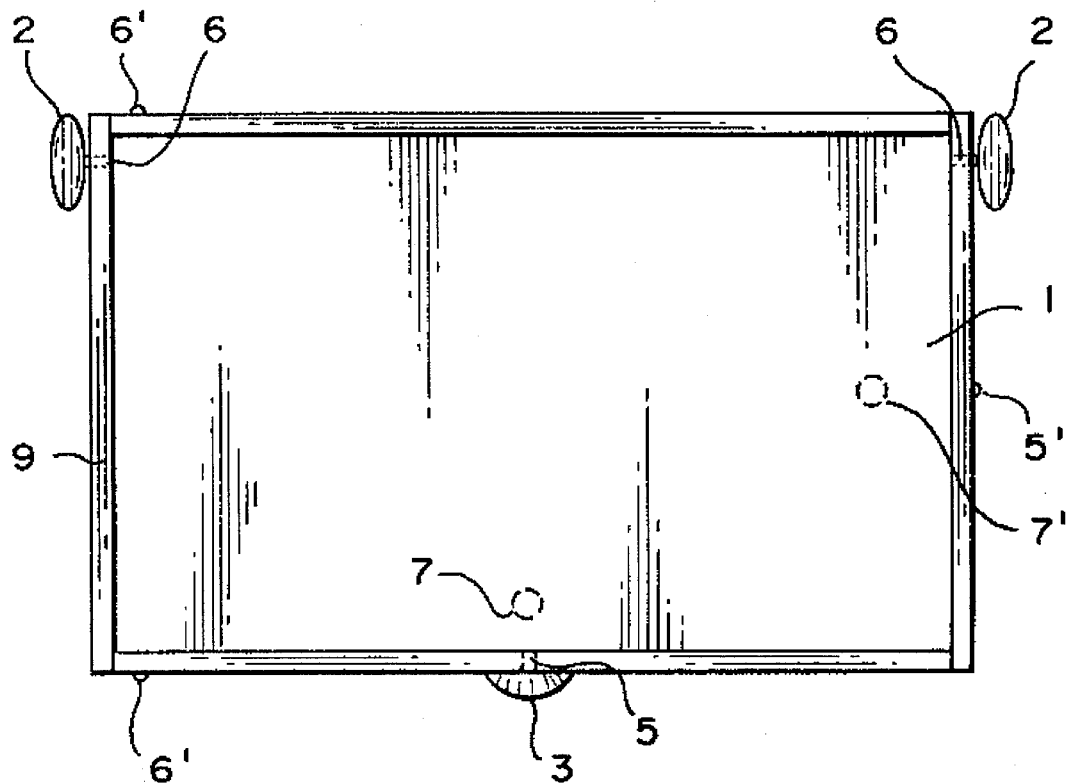
FIG. 1 shows a top view of the crumb collection tray.
Figure 2:
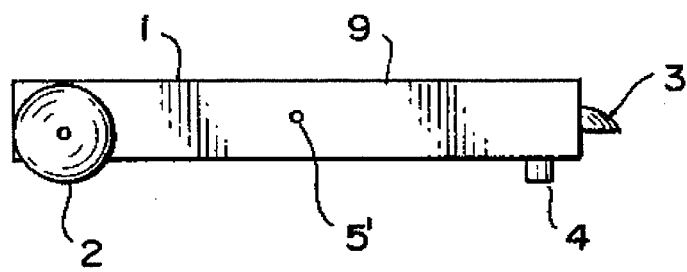
FIG. 2 shows a right side view of the crumb collection tray.
Figure 3:
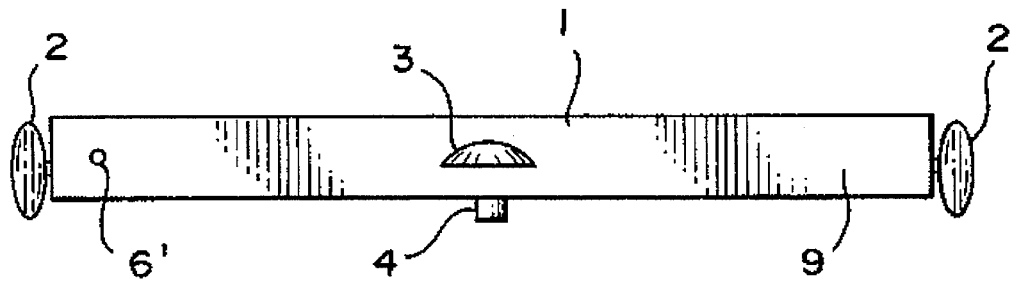
FIG. 3 shows a front view of the crumb collection tray.

As shown in FIGS. 1–3, the crumb collection tray of the present invention comprises a rectangular base 1, with ¾" high sides 9, two wheels 2, a foot 4 and a handle 3. The base is preferably made by plastic injection molding, although other known methods or equivalent materials may be used. The molded product contains various connection holes and alternative placement holes as will be further detailed below.

The tray in FIG. 1 is configured for widthwise movement as defined by the placement of wheels 2 on the short sides of the rectangular base. The wheels are attached through a pair of holes 6 located near the rear corners of the base using a suitable axle means such as screws, nails, pins, etc. The handle 3 is attached to the front of the base using hole 5. Any suitable shaped or size handle sufficient to grip the device would be adequate. Also the handle could be integrally molded. A foot, shown in FIGS. 2 and 3, is attached to the bottom side of the base using hole 7 located near the front of the base. The handle and foot can be attached with any securing means such as nails, screws rivets or any known adhesives.

Alternatively, the tray can be set up for lengthwise movement. In this alternative embodiment (not shown) the wheels are attached using an alternate set of holes 6', located near the corners on the long sides of the base. This provides for a tray with longer sides along the length and shorter sides across the front and back widths. Similarly, the handle 3 and foot 4 are attached using alternate holes 5' and 7' located on or near the front of the base.

The inclusion of alternate holes allows the buyer the choice of directional movement of the tray (i.e. lengthwise or widthwise as shown if FIG. 1). In either embodiment the foot is positioned toward the (front) side opposite the wheels, to provide stability. Accordingly, the handle is placed on the front to provide ease in handling.

It is envisioned that the crumb collection tray can be used with most any conventional toaster. It is preferred that the toaster's trap door be removed so that crumbs may fall directly onto the tray's base. In use, the tray is set on the counter and then the toaster is set directly onto the tray. During a toasting operation crumbs will fall onto the tray. The side walls will contain the crumbs and prevent spillage on to the counter top. After each use, the toaster may be temporarily removed and the tray taken by it's handle to a sink and emptied. The wheels provide ease in mobility and help prevent scratches. The tray is the placed back onto the counter and the toaster is replaced on the tray.

CONCLUSION

A method and apparatus has been shown in the above embodiments for the effective implementation of a crumb collection tray. While various preferred embodiments have been shown and described, it will be understood that there is no intent to limit the invention by such disclosure, but rather, is intended to cover all modifications and alternate constructions falling within the spirit and scope of the invention as defined in the appended claims.

The crumb collection tray of the present invention can be made of various equivalent materials, such as aluminum or sheet metal, etc. and sized and/or shaped to fit any size/shape toaster. The sides of the base can be of any height and angle. For example, they can be 1 inch high and vertical, or sloped to a slight angle. The crumb collection tray can also be made and used with or without wheels, and is not limited by the specific number of wheels, (i.e. three or four). For example, one wheel could be placed at or near each corner. Likewise, the foot can be omitted altogether, or multiple feet could be used. Finally, the handle can be integrally molded or combined into the base, or it can be omitted.

I claim:

1. A universal external crumb collector for a toaster comprising: a rectangular base with raised side edges, wheel mounting means near at least two adjacent corners of the base for attachment of wheels to aid in the mobility of said base, foot mounting means on the underside of said base for the attachment of at least one foot to aid in the stability of the base, handle mounting means along the side closest to said foot mounting means for attachment of at least one handle, and wherein said toaster contains a trap door which is removed prior to use with said base.

2. The universal external crumb collector of claim 1, wherein the wheel mounting means allows for the selective attachment of wheels to aid in the mobility of the collector in either a lengthwise or widthwise direction.

3. The universal external tray of claim 1, wherein the base is made of plastic.

4. The universal external crumb collector for a toaster of claim 1, wherein said foot mounting means includes attachment holes located along the side edges to allow mounting in either a lengthwise or widthwise direction.

5. The universal external crumb collector for a toaster of claim 1, wherein the handle further includes attachment holes located along the side edges to allow selective mounting.

* * * * *